(12) United States Patent
Kang et al.

(10) Patent No.: US 11,569,037 B2
(45) Date of Patent: Jan. 31, 2023

(54) CERAMIC ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Sung Hyung Kang, Suwon-si (KR); Jong Hyun Cho, Suwon-si (KR); Ji Hong Jo, Suwon-si (KR); Hang Kyu Cho, Suwon-si (KR); Jae Shik Shim, Suwon-si (KR); Yong In Kim, Suwon-si (KR); Sang Roc Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 239 days.

(21) Appl. No.: 16/857,280

(22) Filed: Apr. 24, 2020

(65) Prior Publication Data

US 2021/0210288 A1 Jul. 8, 2021

(30) Foreign Application Priority Data

Jan. 7, 2020 (KR) ........................ 10-2020-0001979

(51) Int. Cl.
*H01G 4/30* (2006.01)
*H01G 4/012* (2006.01)
(Continued)

(52) U.S. Cl.
CPC .......... *H01G 4/30* (2013.01); *C04B 35/4682* (2013.01); *H01G 4/008* (2013.01); *H01G 4/012* (2013.01);
(Continued)

(58) Field of Classification Search
CPC .......... H01G 4/30; H01G 4/008; H01G 4/012; H01G 4/1227; C04B 35/4682; C04B 2235/652; C04B 2235/783
See application file for complete search history.

(56) References Cited

U.S. PATENT DOCUMENTS

| | | |
|---|---|---|
| 2006/0216512 A1 | 9/2006 | Fujikawa et al. |
| 2010/0022382 A1 | 1/2010 | Kang et al. |

(Continued)

FOREIGN PATENT DOCUMENTS

| | | | |
|---|---|---|---|
| EP | 1128404 A2 | 2/2001 | |
| EP | 1128404 B1 * | 4/2015 | ........... C01G 23/006 |

(Continued)

OTHER PUBLICATIONS

Japanese Office Action dated Dec. 16, 2021, issued in corresponding Japanese Patent Application No. 2020-0001979.

(Continued)

*Primary Examiner* — Karl E Group
*Assistant Examiner* — Cameron K Miller
(74) *Attorney, Agent, or Firm* — Morgan, Lewis & Bockius LLP

(57) ABSTRACT

A ceramic electronic component includes a body including a dielectric layer and an internal electrode, and an external electrode disposed on the body and connected to the internal electrode. The dielectric layer includes a plurality of dielectric grains, and at least one of the plurality of dielectric grains has a core-dual shell structure having a core and a dual shell. The dual shell includes a first shell surrounding at least a portion of the core, and a second shell surrounding at least a portion of the first shell, and a concentration of a rare earth element included in the second shell is more than 1.3 times to less than 3.8 times a concentration of a rare earth element included in the first shell.

26 Claims, 5 Drawing Sheets

(51) Int. Cl.
*H01G 4/008* (2006.01)
*H01G 4/12* (2006.01)
*C04B 35/468* (2006.01)

(52) U.S. Cl.
CPC ..... *H01G 4/1227* (2013.01); *C04B 2235/652* (2013.01); *C04B 2235/783* (2013.01)

(56) References Cited

U.S. PATENT DOCUMENTS

| | | |
|---|---|---|
| 2011/0157769 A1 | 6/2011 | Kang et al. |
| 2012/0033343 A1 | 2/2012 | Yoon et al. |
| 2013/0119827 A1 | 5/2013 | Kang et al. |
| 2014/0268484 A1 | 9/2014 | Kang et al. |
| 2016/0155570 A1 | 6/2016 | Shimada et al. |
| 2016/0181019 A1* | 6/2016 | Park .................. H01G 4/12 361/301.4 |

FOREIGN PATENT DOCUMENTS

| | | |
|---|---|---|
| JP | 2008-247657 A | 10/2008 |
| JP | 2010-024126 A | 2/2010 |
| KR | 10-2009-0105972 A | 10/2009 |

OTHER PUBLICATIONS

Korean Office Action dated Apr. 9, 2021 issued in Korean Patent Application No. 10-2020-0001979 (with English translation).
Korean Office Action dated Dec. 16, 2021, issued in corresponding Korean Patent Application No. 10-2020-0001979.

* cited by examiner

CERAMIC ELECTRONIC COMPONENT AND METHOD OF MANUFACTURING THE SAME

CROSS-REFERENCE TO RELATED APPLICATION(S)

This application claims benefit of priority to Korean Patent Application No. 10-2020-0001979 filed on Jan. 7, 2020 in the Korean Intellectual Property Office, the disclosure of which is incorporated herein by reference in its entirety.

BACKGROUND

1. Field

The present disclosure relates to a ceramic electronic component and a method of manufacturing the same.

2. Description of Related Art

In general, a ceramic electronic component using a ceramic material such as a capacitor, an inductor, a piezoelectric element, a varistor, a thermistor, or the like may include a ceramic body made of the ceramic material, an internal electrode formed in the ceramic body, and an external electrode disposed on a surface of the ceramic body to be connected to the internal electrode.

Multilayer ceramic capacitors (MLCCs), a type of ceramic electronic component, are being developed to have increasing capacity through the ultra-thinning of layers thereof.

A high capacity multilayer ceramic capacitor (MLCC) may include barium titanate ($BaTiO_3$) as a main material to form a body, and nickel as a base material of the internal electrode.

Such a body is generally fired in a reduction atmosphere. In this case, the dielectric therein should be resistant to the reduction.

However, due to the inherent characteristics of the oxide, oxygen in the oxide may escape during the firing operation in the reduction atmosphere to generate oxygen vacancies and electrons. Therefore, reliability and insulation resistance (IR) thereof may be deteriorated.

In order to solve the problems, a method has been proposed in which a rare earth element such as Dy, Y, Ho, or the like is added to suppress the generation of the oxygen vacancies, to reduce mobility of oxygen vacancies, and to remove electrons generated by addition of a transition metal.

However, there remains a problem that the above method may be not effective when layers in the multilayer ceramic capacitor are thinned to have a relatively high capacity or when a relatively high voltage is used therein under more severe use environments.

In addition, when the rare earth element or the transition element is added by the above method, a high temperature lifespan characteristics may be deteriorated or a temperature coefficient of capacitance (TCC) characteristic, depending on a change in temperature, may be deteriorated.

SUMMARY

An aspect of the present disclosure is to provide a ceramic electronic component and a method of manufacturing the same, capable of improving reliability.

An aspect of the present disclosure is to provide a ceramic electronic component and a method of manufacturing the same, capable of improving the temperature coefficient of capacitance (TCC) characteristic.

An aspect of the present disclosure is to provide a ceramic electronic component and a method of manufacturing the same, capable of improving high temperature lifespan characteristics.

An aspect of the present disclosure is to provide a ceramic electronic component and a method of manufacturing the same, capable of improving a dielectric constant.

However, the objects of the present disclosure are not limited to the above description, and will be more readily understood in the course of describing specific embodiments of the present disclosure.

According to an aspect of the present disclosure, a ceramic electronic component includes a body including a dielectric layer and an internal electrode, and an external electrode disposed on the body and connected to the internal electrode. The dielectric layer includes a plurality of dielectric grains, and at least one of the plurality of dielectric grains has a core-dual shell structure having a core and a dual shell. Additionally, the dual shell includes a first shell surrounding at least a portion of the core, and a second shell surrounding at least a portion of the first shell, and a concentration of a rare earth element included in the second shell is more than 1.3 times to less than 3.8 times a concentration of a rare earth element included in the first shell.

According to another aspect of the present disclosure, a method of manufacturing a ceramic electronic component includes preparing ceramic green sheets each including a base material powder and a minor component added to the base material powder, the base material powder having a core-shell structure having a core and a shell, and the shell including a rare earth element. A conductive paste for an internal electrode is printed on the ceramic green sheets, and the printed ceramic green sheets are stacked to prepare a stacked body. The stacked body is fired to prepare a body including a dielectric layer and an internal electrode, and an external electrode is formed on the body. An amount of the rare earth element included in the base material powder is more than 0.6 times to less than 2.4 times an amount of a rare earth element included in the minor component.

According to another aspect of the present disclosure, a ceramic electronic component includes a body including first and second internal electrodes overlapping each other with a dielectric layer disposed therebetween. In a region of the dielectric layer disposed 0.41 µm or less from both the first and second internal electrodes, 50% or more of a total number of dielectric grains in the dielectric layer have a core-dual shell structure having a core, a first shell having a composition different from the core and surrounding at least a portion of the core, and a second shell having a composition different from the first shell and surrounding at least a portion of the first shell.

According to another aspect of the present disclosure, a ceramic electronic component includes a body including first and second internal electrodes overlapping each other with a dielectric layer disposed therebetween. In a region of the dielectric layer disposed 0.41 µm or less from both the first and second internal electrodes, dielectric grains of the dielectric layer have core-shell structures having a core and a first shell surrounding at least a portion of the core and including a rare earth element in a concentration higher than the core.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
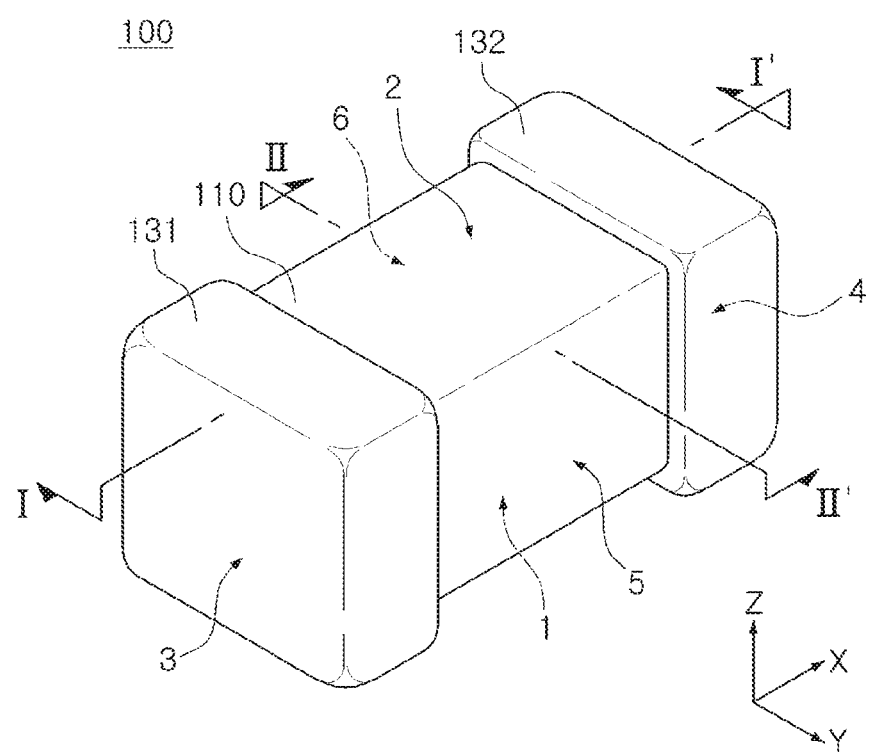
FIG. 1 is a perspective view schematically illustrating a ceramic electronic component according to an embodiment of the present disclosure.

Hereinafter, embodiments of the present disclosure will be described with reference to specific embodiments and the accompanying drawings. However, embodiments of the present disclosure may be modified to have various other forms, and the scope of the present disclosure is not limited to the embodiments described below. Further, embodiments of the present disclosure may be provided for a more complete description of the present disclosure to the ordinary artisan. Therefore, shapes and sizes of the elements in the drawings may be exaggerated for clarity of description, and the elements denoted by the same reference numerals in the drawings may be the same elements.

In the drawings, portions not related to the description will be omitted for clarification of the present disclosure, and a thickness may be enlarged to clearly show layers and regions. Further, throughout the specification, when an element is referred to as "comprising" or "including" an element, it means that the element may further include other elements as well, without departing from the description, unless specifically stated otherwise.

In the drawings, an X direction may be defined as a second direction, an L direction, or a longitudinal direction; a Y direction may be defined as a third direction, a W direction, or a width direction; and a Z direction may be defined as a first direction, a stacking direction, a T direction, or a thickness direction.

Ceramic Electronic Component

FIG. 1 is a perspective view schematically illustrating a ceramic electronic component according to an embodiment of the present disclosure.

Figure 2:
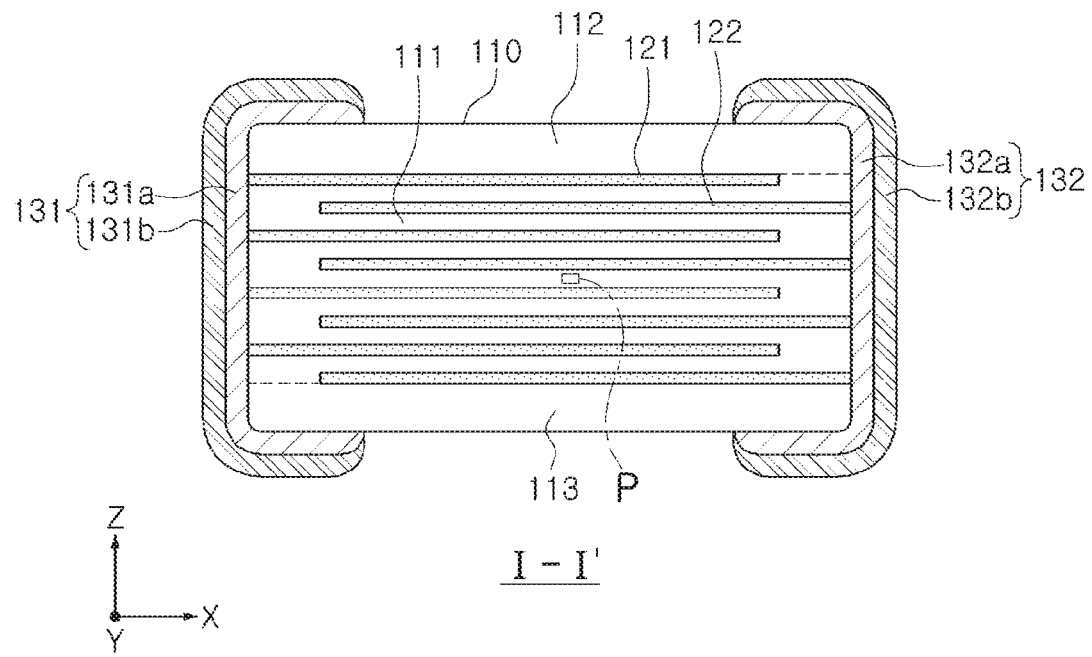
FIG. 2 is a schematic cross-sectional view taken along line I-I' of FIG. 1.

FIG. 2 is a schematic cross-sectional view taken along line I-I' of FIG. 1.

Figure 3:
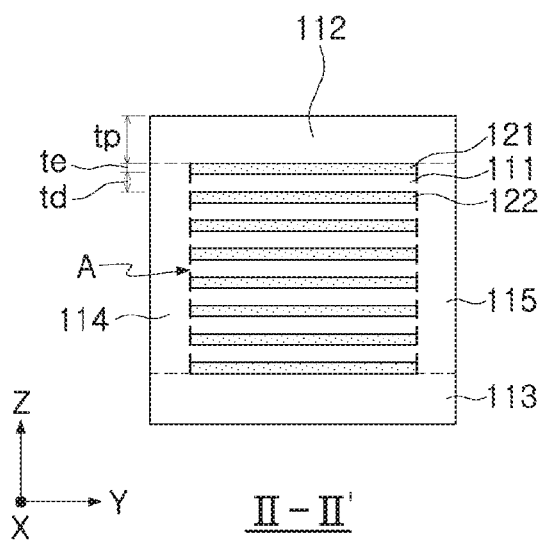
FIG. 3 is a schematic cross-sectional view taken along line II-II' of FIG. 1.

FIG. 3 is a schematic cross-sectional view taken along line II-II' of FIG. 1.

Figure 4:
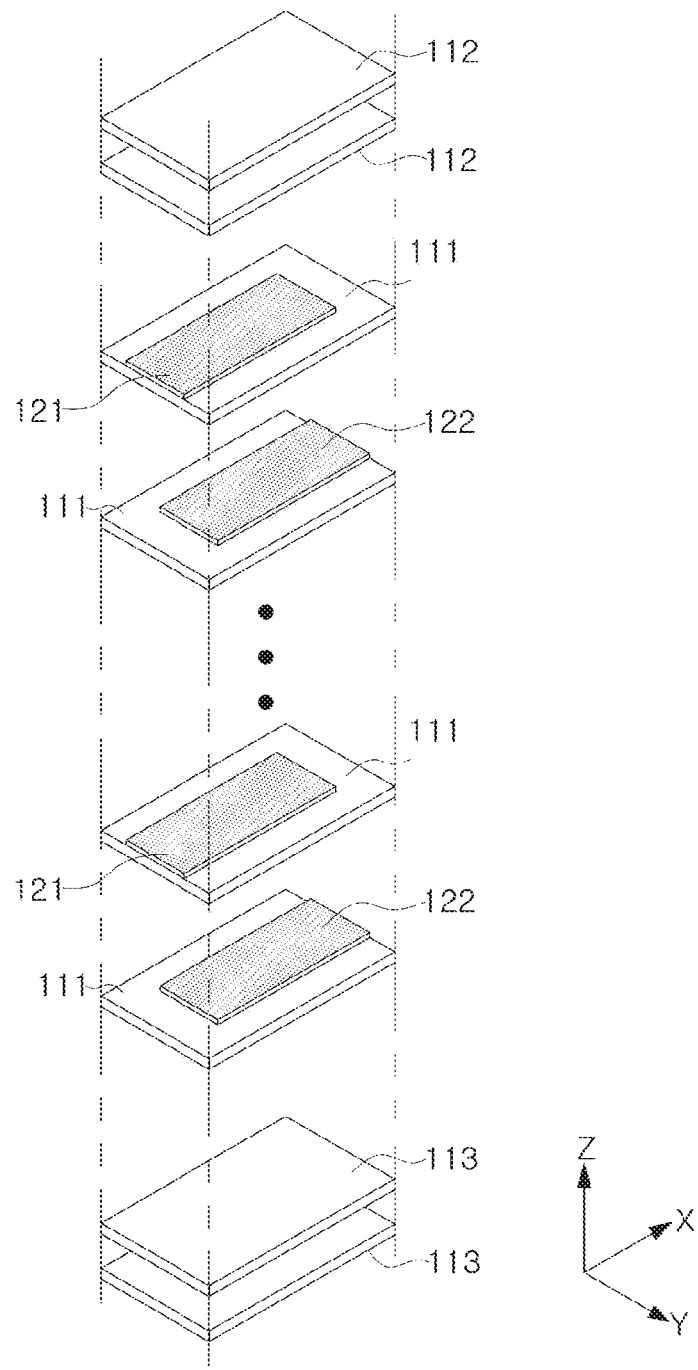
FIG. 4 is an exploded perspective view schematically illustrating a body in which a dielectric layer and an internal electrode are stacked, according to an embodiment of the present disclosure.

FIG. 4 is an exploded perspective view schematically illustrating parts of a body in which a dielectric layer and an internal electrode are stacked, according to an embodiment of the present disclosure.

Figure 5:
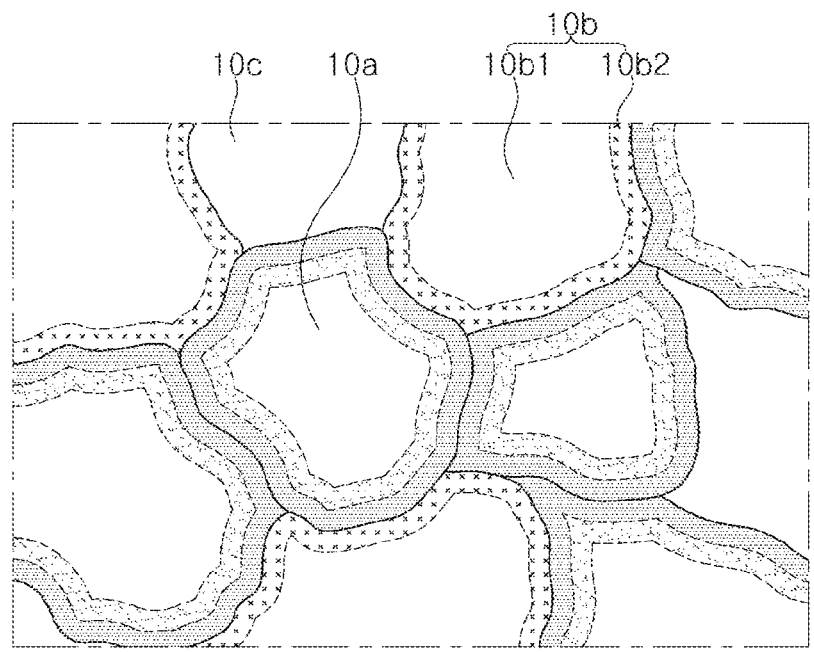
FIG. 5 is an enlarged view of region P of FIG. 2.

FIG. 5 is an enlarged view of region P of FIG. 2.

Figure 6:
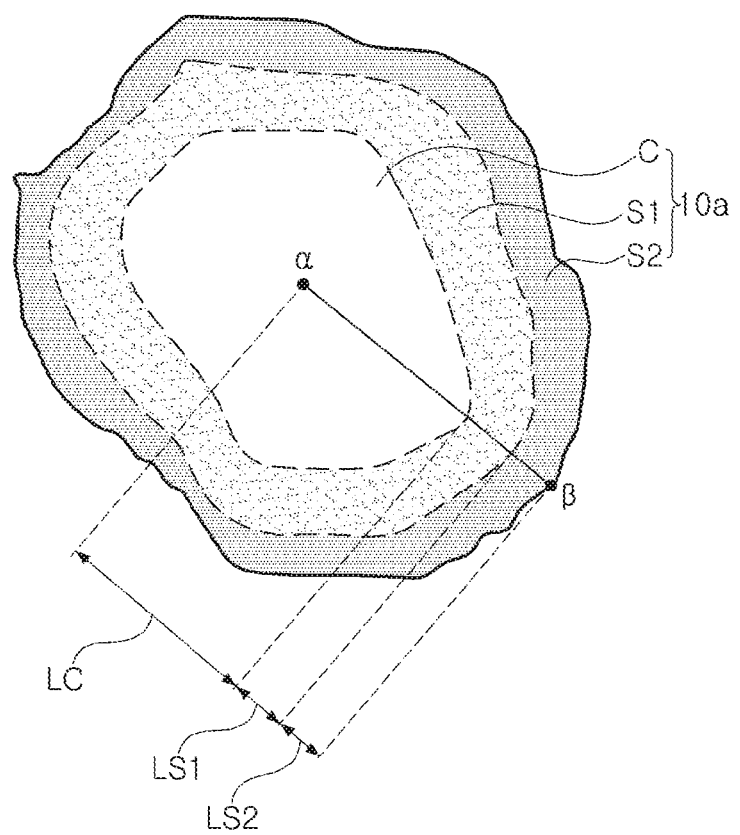
FIG. 6 is a schematic diagram illustrating a grain having a core-dual shell structure.

FIG. 6 is a schematic diagram illustrating a grain having a core-dual shell structure.

Hereinafter, a ceramic electronic component 100 according to an embodiment of the present disclosure will be described in detail with reference to FIGS. 1 to 6. Also, a multilayer ceramic capacitor will be described as an example of a ceramic electronic component, but the present disclosure is not limited thereto. In addition, a ceramic electronic component using a ceramic material such as a capacitor, an inductor, a piezoelectric element, a varistor, a thermistor, or the like may be also applied.

A ceramic electronic component 100 according to the embodiment of the present disclosure includes a body 110 including a dielectric layer 111 and an internal electrode 121 or 122; and an external electrode 131 or 132 disposed on the body 110 and connected to the internal electrode 121 or 122, wherein the dielectric layer 111 includes a plurality of dielectric grains 10a, 10b, and 10c, wherein at least one of the plurality of dielectric grains has a core-dual shell structure having a core C and a dual shell, wherein the dual shell includes a first shell S1 surrounding at least a portion of the core C, and a second shell S2 surrounding at least a portion of the first shell S1, wherein a concentration of a rare earth element included in the second shell S2 is more than 1.3 times to less than 3.8 times a concentration of a rare earth element included in the first shell S1.

In the body 110, a plurality of dielectric layers 111 may be alternately stacked with the internal electrode 121 or 122. Additionally, the internal electrode 121 and 122 may be alternately stacked with dielectric layers therebetween.

Although the specific shape of the body 110 is not particularly limited, as illustrated, the body 110 may have a hexahedral shape or the like. Due to shrinkage of ceramic powder contained in the body 110 during a firing process, the body 110 may not have a perfectly hexahedral shape with completely straight lines, but may have a substantially hexahedral shape overall.

The body 110 may have the first and second surfaces 1 and 2 opposing each other in the thickness direction (the Z direction), the third and fourth surfaces 3 and 4 connected to the first and second surfaces 1 and 2 and opposing each other in the longitudinal direction (the X direction), and the fifth and sixth surfaces 5 and 6 connected to the first and second surfaces 1 and 2, connected to the third and fourth surfaces 3 and 4, and opposing each other in the width direction (the Y direction).

A plurality of dielectric layers 111 forming the body 110 may be in a fired state, and a boundary between adjacent dielectric layers 111 may be integrated to such an extent that it is difficult to identify the individual layers without using a scanning electron microscope (SEM).

Referring to FIG. 5, each dielectric layer 111 may include a plurality of dielectric grains 10a, 10b, and 10c, and at least one of the plurality of dielectric grains may be a dielectric grain 10a having a core-dual shell structure.

Referring to FIG. 6, the dielectric grain 10a having the core-dual shell structure may include a first shell S1 surrounding at least a portion of a core C, and a second shell S2 surrounding at least a portion of the first shell S1.

Development of multilayer ceramic capacitors (MLCC), as an example of a common ceramic electronic component, has focused on increasing capacity and ultra-thinning of layers of MLCCs. With the increase in capacity and the ultra-thinning in layers, it has become increasing difficult to secure resistance to voltage characteristics of a dielectric layer in the multilayer ceramic capacitor, and an increase in a defect rate due to deterioration of insulation resistance of dielectric layer has emerged as a problem.

In order to solve the problems, a method in which a rare earth element such as Dy, Y, Ho, or the like is added to suppress the generation of oxygen vacancies, to reduce mobility of the oxygen vacancies, and to remove electrons generated by the addition of a transition metal, has been proposed.

However, when layers in the multilayer ceramic capacitor are thinned to have a relatively high capacity or when a relatively high voltage is used therein under more severe use environments, there have been cases in which a simple addition of the rare earth element or the transition element may not sufficiently solve the above problems, or a high temperature lifespan characteristics or a temperature coefficient of capacitance (TCC) characteristic depending on a change in temperature may not have a desirable level.

Therefore, in the present disclosure, at least one of the plurality of dielectric grains has a core-dual shell structure, and in the core-dual shell structure, a ratio of a concentration of a rare earth element included in the first shell and a concentration of a rare earth element included in the second shell may be controlled to secure better high temperature lifespan characteristics and TCC characteristics.

The rare earth elements included in the first shell S1 and the second shell S2 may basically replace an A site or a B site of a perovskite structure, represented by $ABO_3$, to form a shell region. The shell region may act as a barrier to prevent flow of electrons at grain boundaries of dielectric grains, to prevent the leakage current.

In addition, as the shells S1 and S2 have a dual structure composed of the first shell S1 and the second shell S2 having different concentrations, the high temperature lifespan characteristics and the TCC characteristics may be further improved.

The rare earth element may not exist or be present in the core C, or only a trace amount thereof may exist or be present in the core C. Therefore, a concentration of the rare earth element included in the core C may be 0.1 times or less a concentration of the rare earth element included in the first shell S1.

In addition, since the concentration of the rare earth element rapidly changes at a boundary between the core C and the first shell S1, and rapidly changes at a boundary between the first shell S1 and the second shell S2, the core C, the first shell S1, and the second shell S2 may be easily distinguished, and may be confirmed through TEM-EDS analysis.

As illustrated in FIGS. 5 and 6, the first shell S1 may be disposed to cover an entire surface of the core C, and the second shell S2 may be disposed to cover an entire surface of the first shell S1. The first shell may not cover a portion of a surface of the core (e.g., the first shell may cover less than an entirety of the surface of the core), and the second shell may exist in a form not covering a portion of a surface of the first shell (e.g., the second shell may cover less than an entirety of the surface of the first shell).

In this case, the first shell S1 may be disposed to cover at least 90 area % of the surface of the core, and the second shell S2 may be disposed to cover at least 90 area % of the surface of the first shell S1. When the first shell S1 is disposed to cover less than 90 area % of the surface of the core, and/or the second shell S2 is disposed to cover less than 90 area % of the surface of the first shell S1, the effect of improving reliability according to the present disclosure may not be sufficient.

The concentration of the rare earth element included in the second shell S2 may be greater than 1.3 times and less than 3.8 times the concentration of the rare earth element included in the first shell S1.

When the concentration of the rare earth element included in the second shell S2 is 1.3 times or less than the concentration of the rare earth element included in the first shell S1, the concentration of the rare earth element included in the first shell S1 may be similar to the concentration of the rare earth element included in the second shell S2. Therefore, the effect of improving reliability according to the core-dual shell structure may not be sufficient.

When the concentration of the rare earth element included in the second shell S2 is 3.8 times or more than the concentration of the rare earth element included in the first shell S1, the concentration of the rare earth element included in the second shell S2 may become too high. Therefore, since a secondary phase may be formed by the rare earth element, reliability may be deteriorated.

Referring to FIG. 6, a distance (LS2) corresponding to a thickness of the second shell along a straight line connecting $\alpha$ and $\beta$ may be greater than 4% and less than 25% of a distance between $\alpha$ and $\beta$, where $\alpha$ denotes a center of the core-dual shell structure in the cross-section of the core-dual shell structure, and $\beta$ denotes a point on a surface of the second shell, farthest from $\alpha$. In this case, $\alpha$ may refer to a center of gravity of the dielectric grain in a cross-section.

When the distance (LS2) corresponding to the thickness of the second shell along the straight line connecting $\alpha$ and $\beta$ is 4% or less, the effect of improving reliability may not be sufficient, and the effect of improving high temperature lifespan characteristics and the dielectric constant may be deteriorated.

When the distance (LS2) corresponding to the thickness of the second shell along the straight line connecting $\alpha$ and $\beta$ is 25% or more, the high temperature lifespan characteristics may be deteriorated or the temperature coefficient of capacitance (TCC) characteristics depending on a change in temperature may be deteriorated.

Therefore, it is preferable that the distance (LS2) corresponding to the thickness of the second shell along the straight line connecting $\alpha$ and $\beta$ is more than 4% and less than 25%, more preferably 4.5% or more and 24% or less, even more preferably 5% or more and 20% or less.

In this case, a distance (LS1) corresponding to the thickness of the first shell along the straight line connecting $\alpha$ and $\beta$ may be 5% or more and 30% or less of the distance between $\alpha$ and $\beta$.

When the distance (LS1) corresponding to the thickness of the first shell along the straight lines connecting $\alpha$ and $\beta$ is less than 5%, it may be difficult to implement a dual shell structure. When the distance (LS1) corresponding to the thickness of the first shell along the straight lines connecting $\alpha$ and $\beta$ exceeds 30%, it may be difficult to secure reliability.

In addition, when the distance/thickness (LS1) of the first shell is quite different from the distance of the second shell, it may be difficult to simultaneously improve the high temperature lifespan characteristics and the TCC characteristics. Therefore, the distance/thickness (LS1) corresponding to the first shell among the straight lines connecting $\alpha$ and $\beta$ may be 0.5 to 1.5 times the distance/thickness (LS2) corresponding to the second shell among the straight lines connecting $\alpha$ and $\beta$.

Referring to FIG. 5, the dielectric layer 111 may include a dielectric grain 10b having a core-shell structure, in addition to the dielectric grain 10a having the core-dual shell structure. Therefore, at least one or more of the plurality of dielectric grains may be the dielectric grain 10b having the core-shell structure. The dielectric grain 10b having the core-shell structure may include a core 10b1, and a shell 10b2 surrounding at least a portion of the core 10b1. In this case, the shell 10b2 of the core-shell structure may have an amount of a rare earth, different from amounts of the shells S1 and S2 of the core-dual shell structure. The present disclosure is not limited thereto, and the shell 10b2 of the core-shell structure may have the same amount of a rare earth as an amount of one of the shells S1 and S2 of the core-dual shell structure.

In addition, the dielectric layer 111 may include a dielectric grain 10c having no separate shell.

In this case, the number of the dielectric grains 10a having the core-dual shell structure, among the plurality of dielectric grains 10a, 10b, and 10c, may be 50% or more. In this case, a ratio of the number of dielectric grains having a core-dual shell structure may be measured in an image of a cross-section of the dielectric layer scanned by a transmission electron microscope (TEM).

When the number of the dielectric grains having the core-dual shell structure, among the plurality of dielectric grains, is less than 50%, the effect of improving high temperature lifespan characteristics and the TCC characteristic may be not sufficient.

Meanwhile, the dielectric layer 111 may include a material having a perovskite structure represented by $ABO_3$ as a main component.

For example, the dielectric layer 111 may include one or more of $BaTiO_3$, (Ba, Ca) (Ti, Ca) $O_3$, (Ba, Ca) (Ti, Zr) $O_3$, Ba (Ti, Zr) $O_3$, and (Ba, Ca) (Ti, Sn) $O_3$ as a main component.

More specifically, for example, the dielectric layer 111 may include one or more selected from the group consisting of $BaTiO_3$, $(Ba_{1-x}Ca_x)$ $(Ti_{1-y}Ca_y)$ $O_3$ (where $0 \leq x \leq 0.3$, $0 \leq y \leq 0.1$), $(Ba_{1-x}Ca_x)$ $(Ti_{1-y}Zr_y)$ $O_3$ (where $0 \leq x \leq 0.3$, $0 \leq y \leq 0.5$), Ba $(Ti_{1-y}Zr_y)$ $O_3$ (where $0 < y \leq 0.5$), and $(Ba_{1-x}Ca_x)$ $(Ti_{1-y}Sn_y)O_3$ (where $0 \leq x \leq 0.3$, $0 \leq y \leq 0.1$), as main components.

In addition, the dielectric layer 111 may include an amount of the rare earth element in a range of 0.1 to 15 moles, relative to 100 moles of the main component.

When an amount of the rare earth element included in the dielectric layer 111 is less than 0.1 mole, relative to 100 moles of the main component, it may be difficult to implement a core-dual shell structure. When an amount of the rare earth element included in the dielectric layer 111 exceeds 15 moles, relative to 100 moles of the main component, the firing temperature may be rapidly increased. Therefore, it may be difficult to obtain a dense microstructure.

In this case, the rare earth element may be one or more of lanthanum (La), yttrium (Y), actinium (Ac), cerium (Ce), praseodymium (Pr), neodium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Ru).

In addition, the minor component included in the dielectric layer 111 is not particularly limited, except that a rare earth element should be included, and an appropriate element and amount thereof may be determined to obtain desired characteristics. For example, the dielectric layer 111 may further include one or more of Mn, Cr, Ba, Si, Al, Mg, and Zr as a minor component, in addition to the rare earth element.

A size of the dielectric grains is not particularly limited. For example, an average grain size of the dielectric grains in the dielectric layer 111 may be 50 nm or more and 500 nm or less.

When the average grain size is less than 50 nm, there may be a problem in that an expected effect due to a low dielectric constant and a grain growth rate may be insufficient to achieve the expected effect. When the average grain size exceeds 500 nm, a change in capacity depending on a temperature and a DC voltage may increase, and reliability may decrease due to a decrease in the number of dielectric grains per unit volume of dielectric layer.

The body 110 may include a capacitance formation portion A disposed in the body 110 and including a first internal electrode 121 and a second internal electrode 122 arranged to face and overlap each other with the dielectric layer 111 interposed therebetween, to form capacitance; and cover portions 112 and 113 formed on and below the capacitance formation portion A.

In addition, the capacitance formation portion A may be a portion contributing to capacitance formation of a capacitor, and may be formed by repeatedly and alternately stacking the plurality of first and second internal electrodes 121 and 122 with dielectric layers 111 interposed therebetween.

An upper cover portion 112 and a lower cover portion 113 may be formed by stacking a single dielectric layer or two or more dielectric layers on upper and lower surfaces of the capacitance formation portion in the vertical direction, respectively, and may function to basically prevent the internal electrodes from being damaged by external physical or chemical stress.

The upper cover portion 112 and the lower cover portion 113 may not include internal electrodes, and may include the same material as the dielectric layer 111.

For example, the upper cover portion 112 and the lower cover portion 113 may include a ceramic material, for example, may include a barium titanate ($BaTiO_3$)-based ceramic material.

In addition, margin portions 114 and 115 may be disposed on side surfaces of the capacitance formation portion A.

The margin portions 114 and 115 may include a margin portion 114 disposed on the sixth surface 6 of the body 110, and a margin portion 115 disposed on the fifth surface 5 of the body 110. For example, the margin portions 114 and 115 may be disposed on both side surfaces of the body 110 opposing each other in the width direction.

As illustrated in FIG. 3, the margin portions 114 and 115 may refer to a region between ends of the first and second internal electrodes 121 and 122, in the cross-section of the body 110 cut in width-thickness (WT) directions, and a boundary surface of the body 110.

The margin portions 114 and 115 may basically serve to prevent damage to the internal electrode due to external physical or chemical stress.

The margin portions 114 and 115 may be formed by applying a conductive paste to form internal electrodes in regions of a ceramic green sheet except for an edge region in which the margin portions are formed.

Alternatively or additionally, in order to suppress a step difference caused by the internal electrodes 121 and 122, after a stacking operation, the internal electrodes may be cut to be exposed from the fifth and sixth surfaces 5 and 6 of the body. Then, a single dielectric layer or two or more dielectric layers may be stacked on both exposed surfaces of the capacitance formation portion A in the width direction, to form the margin portions 114 and 115.

The internal electrodes 121 and 122 may be alternately stacked with the dielectric layer 111.

The internal electrodes 121 and 122 may include first internal electrode(s) 121 and second internal electrode(s) 122. The first and second internal electrodes 121 and 122 may be alternately arranged to face and overlap each other, with the dielectric layers 111, constituting the body 110, interposed therebetween, and may respectively be exposed from the third and fourth surfaces 3 and 4 of the body 110.

Referring to FIG. 2, the first internal electrode(s) 121 may be configured to be spaced apart from the fourth surface 4, and be exposed from the third surface 3, and the second internal electrode (s) 122 may be configured to be spaced apart from the third surface 3, and be exposed from the fourth surface 4.

In this case, the first and second internal electrodes 121 and 122 may be electrically separated from each other by the dielectric layer 111 interposed therebetween.

Referring to FIG. 3, the body 110 may be formed by alternately stacking a ceramic green sheet on which the first internal electrode 121 is printed and a ceramic green sheet on which the second internal electrode 122 is printed, and then firing the stacked ceramic green sheet laminate.

A material for forming the internal electrodes 121 and 122 is not particularly limited, and a material having excellent electrical conductivity may be used. For example, the internal electrodes 121 and 122 may be formed by printing a conductive paste for the internal electrodes containing one or more of nickel (Ni), copper (Cu), palladium (Pd), silver (Ag), gold (Au), platinum (Pt), tin (Sn), tungsten (W), titanium (Ti), and alloys thereof, on the ceramic green sheet.

As a printing method of the conductive paste for the internal electrodes, a screen-printing method, a gravure printing method, or the like may be used, but the present disclosure is not limited thereto.

In order to achieve miniaturization and high capacitance of the multilayer ceramic capacitor, thicknesses of the dielectric layer (s) and the internal electrode (s) should be thinned to increase the number of stacked layers. Therefore, as the thicknesses of the dielectric layer(s) and the internal electrode(s) are thinned, reliability may be deteriorated, and characteristics, such as an insulation resistance, breakdown voltage, or the like may be deteriorated.

Therefore, as the thicknesses of the dielectric layer(s) and the internal electrode(s) are thinned, the effect of improving reliability according to the present disclosure may increase.

In particular, when a thickness (td) of the internal electrodes 121 and 122 or a thickness (td) of the dielectric layer(s) 111 is 0.41 µm or less, the effect of improving high temperature lifespan characteristics and the TCC characteristics according to the present disclosure may be remarkable.

The thickness (te) of the internal electrodes 121 and 122 may refer to an average thickness of the first and second internal electrodes 121 and 122.

The thickness (te) of the internal electrodes 121 and 122 may be measured by scanning an image of a cross-section in the third and first directions (an L-T cross-section) of the body 110 by a scanning electron microscope (SEM).

For example, on the basis of a reference internal electrode layer at a point at which a center line in the longitudinal direction of the body and a center line in the thickness direction of the body meet, a thickness (te) of the internal electrodes 121 and 122 may be determined by defining two points to the left and two points to the right from a reference center point in the reference internal electrode layer at equal intervals, measuring a thickness of each of the defined points, and obtaining an average value therefrom, for five internal electrode layers including the reference internal electrode layer, and two upper internal electrode layers and two lower internal electrode layers, respectively arranged on and below the reference internal electrode layer, among the internal electrode layers extracted from an image of a cross-section in the third and first directions (an L-T cross-section) of the body 110, cut in a central portion of the body 110 in the width direction, scanned by a scanning electron microscope (SEM).

For example, since a thickness at the reference center point in the reference internal electrode layer at a point at which a center line in the longitudinal direction of the body and a center line in the thickness direction of the body meet, and a thickness (each 500 nm) at each of the two points to the left and right from the reference center point at equal intervals, for the above five internal electrode layers, may be measured, the thickness (te) of the internal electrodes 121 and 122 may be determined as an average value of the thicknesses of the total 25 points.

The thickness (td) of the dielectric layer 111 may refer to an average thickness of the dielectric layer(s) 111 disposed between the first and second internal electrodes 121 and 122.

Similar to the thickness (te) of the internal electrode, the thickness (td) of the dielectric layer 111 may be measured by scanning an image of a cross-section in the third and first directions (an L-T cross-section) of the body 110 by a scanning electron microscope (SEM).

For example, on the basis of a reference dielectric layer at a point at which a center line in the longitudinal direction of the body and a center line in the thickness direction of the body meet, a thickness (td) of the dielectric layer 111 may be determined by defining two points to the left and two points to the right from a reference center point in the reference dielectric layer at equal intervals, measuring a thickness of each of the defined points, and obtaining an average value therefrom, for five dielectric layers including the reference dielectric layer, and two upper dielectric layers and two lower dielectric layers, respectively arranged on and below the reference dielectric layer, among the dielectric layers extracted from an image of a cross-section in the third and first directions (an L-T cross-section) of the body 110, cut in a central portion of the body 110 in the width direction, scanned by a scanning electron microscope (SEM).

For example, since a thickness at the reference center point in the reference dielectric layer at a point at which a center line in the longitudinal direction of the body and a center line in the thickness direction of the body meet, and a thickness (each 500 nm) at each of the two points to the left and right from the reference center point at equal intervals, for the above five dielectric layers, may be measured, the thickness (td) of the dielectric layer 111 may be determined as an average value of the thicknesses of the total 25 points.

The external electrodes 131 and 132 may be arranged on the body 110, and may be connected to the internal electrodes 121 and 122, respectively.

As illustrated in FIG. 2, first and second external electrodes 131 and 132 may be disposed on the third and fourth surfaces 3 and 4 of the body 110, respectively, and may be connected to the first and second internal electrodes 121 and 122, respectively.

In the present embodiment, a structure in which the ceramic electronic component 100 has two external electrodes 131 and 132 may be described, but the number, shape, and the like of the external electrodes 131 and 132 may be changed, depending on shapes of the internal electrodes 121 and 122, or other purposes.

The external electrodes 131 and 132 may be formed using any material as long as they have electrical conductivity such as metal, a specific material may be determined in consideration of electrical characteristics, structural stability, and the like, and may have a multilayer structure.

For example, the external electrodes 131 and 132 may include electrode layers 131a and 132a, and plated layers 131b and 132b formed on the electrode layers 131a and 132a, respectively.

As a more specific example of the electrode layers 131a and 132a, the electrode layers 131a and 132a may be sintered electrodes including a conductive metal and a glass, or resin-based electrodes including a conductive metal and a resin.

In addition, the electrode layers 131a and 132a may have a form in which the sintered electrode and the resin-based electrode are sequentially formed on the body 110. In addition, the electrode layers 131a and 132a may be formed by transferring a sheet including the conductive metal on the body 110, or may be formed by transferring the sheet including the conductive metal on the sintered electrode.

The conductive metal used for the electrode layers 131a and 132a is not particularly limited as long as it is a material that may be electrically connected to the internal electrode (s) to form capacitance. For example, the conductive metal may be one or more of nickel (Ni), copper (Cu), palladium (Pd), silver (Ag), gold (Au), platinum (Pt), tin (Sn), tungsten (W), titanium (Ti), and alloys thereof.

The plated layers 131b and 132b may be plated layers including one or more of nickel (Ni), tin (Sn), palladium (Pd), and alloys thereof, and may be formed of a plurality of layers.

As a more specific example of the plated layers 131b and 132b, the plated layers 131b and 132b may be nickel (Ni) plated layers or tin (Sn) plated layers, may have a form in which the nickel (Ni) plated layers and the tin (Sn) plated layers are sequentially formed on the electrode layers 131a and 132a, and may have a form in which a tin (Sn) plated layer, a nickel (Ni) plated layer, and another tin (Sn) plated layer are formed sequentially. In addition, the plated layers 131b and 132b may include a plurality of nickel (Ni) plated layers and/or a plurality of tin (Sn) plated layers.

Method of Manufacturing Ceramic Electronic Component

Hereinafter, a method of manufacturing a ceramic electronic component according to another aspect of the present disclosure will be described in detail. However, in order to avoid overlapping descriptions, descriptions overlapping those described in the ceramic electronic component will be omitted.

According to another aspect of the present disclosure, a method of manufacturing a ceramic electronic component, includes: preparing a base material powder having a core-shell structure having a core and a shell, the shell including a rare earth element; adding a minor component to the base material powder to prepare a ceramic green sheet; printing a conductive paste for an internal electrode on the ceramic green sheet, and then stacking the printed ceramic green sheet to prepare a stacked body; firing the stacked body to prepare a body including a dielectric layer and an internal electrode; and forming an external electrode on the body, wherein an amount of the rare earth element included in the base material powder is more than 0.6 times to less than 2.4 times an amount of a rare earth element included in the minor component.

First, a base material powder having a core-shell structure having a core and a shell, the shell including a rare earth element, may be prepared.

When the base material powder does not have the core-shell structure, it may be difficult to implement dielectric grains having a core-dual shell structure according to the present disclosure.

The method of manufacturing the base material powder having the core-shell structure is not specifically limited. For example, when manufacturing $BaTiO_3$ by a hydrothermal synthesis process, the rare earth element may be added, in the process of growing the powder to a desired size, to synthesize the base material powder. Alternatively, after mixing the $BaTiO_3$ with the rare earth element, the base material powder having the core-shell structure may be manufactured through heat treatment.

Next, a minor component may be added to the base material powder to prepare a ceramic green sheet. In this case, after adding the minor component to the base material powder, ethanol and toluene as a solvent may be mixed with a dispersant, and a binder may be further mixed therewith to produce a ceramic sheet.

In order to implement dielectric grains having a core-dual shell structure according to the present disclosure, an amount of the rare earth element included in the base material powder may be controlled to be more than 0.6 times to less than 2.4 times an amount of a rare earth element included in the minor component.

When an amount of the rare earth element included in the base material powder is 0.6 times or less an amount of the rare earth element included in the minor component, the dielectric properties may be deteriorated. When an amount of the rare earth element included in the base material powder is 2.4 times or more an amount of the rare earth element included in the minor component, it may be difficult to implement dielectric grains having a core-dual shell structure according to the present disclosure.

Therefore, an amount of the rare earth element included in the base material powder is preferably more than 0.6 times and less than 2.4 times, more preferably 0.7 times or more and 2.2 times or less, even more preferably 0.8 times or more and 2.0 times or less an amount of the rare earth element included in the minor component.

In addition, the element included in the minor component, except for the rare earth element, is not specifically limited, and may be suitably controlled to acquire desired characteristics.

Next, after printing an electrically conductive paste for internal electrodes on the ceramic sheet, a plurality of printed ceramic sheets may be stacked to prepare a stacked body.

Next, the stacked body may be fired to prepare a body including dielectric layer(s) and internal electrode(s).

In this case, the dielectric layer(s) may include a plurality of dielectric grains, at least one or more of the plurality of dielectric grains may have a core-dual shell structure having a core and a dual shell, the dual shell may include a first shell surrounding at least a portion of the core, and a second shell surrounding at least a portion of the first shell, and a concentration of a rare earth element included in the second shell may be more than 1.3 times to less than 3.8 times a concentration of a rare earth element included in the first shell.

In addition, in order to make a concentration of a rare earth element included in the second shell be more than 1.3 times and less than 3.8 times a concentration of a rare earth element included in the first shell, a firing temperature as well as an amount of a rare earth element, which are added to the base material powder and the minor component, are adjusted suitably.

A specific numerical range of the firing temperature may vary depending on a type and amount of additional elements, but is not particularly limited. For example, the range of the firing temperature may be more than 1230° C. and less than 1280° C.

Next, an external electrode may be formed on the body to obtain a ceramic electronic component.

Example

The base material powders illustrated in Table 1 below were prepared. In this case, "1.2Dy doped BT" refers to a base material powder that has a core-shell structure having a core and a shell and containing 1.2 mol of Dy in the shell, compared to 100 moles of $BaTiO_3$. In addition, "0.5Dy doped BT" refers to a base material powder having a core-shell structure having a core and a shell and containing 0.5 mol of Dy in the shell, compared to 100 moles of $BaTiO_3$. In addition, "Non doped BT" refers to a $BaTiO_3$ powder having no core-shell structure.

Thereafter, the base material powder was added with the minor components listed in Table 1 below, mixed with a dispersant using ethanol and toluene as a solvent, and then a binder was further mixed, to prepare a ceramic sheet. An Ni electrode was printed on the prepared ceramic sheet, and a plurality of printed ceramic sheets were stacked, pressed, and cut to prepare a plurality of chips. The chips were calcined for removing the binder, and then a firing operation under a reducing atmosphere was performed at the firing temperatures illustrated in Table 1 below, to prepare sample chips.

Dielectric constants, 125° C. TCC values, and high temperature lifespan characteristics of the prepared sample chips were measured and are reported in Table 2 below.

The 125° C. TCC values were measured using a LCR meter at a temperature range of −55° C. to 125° C. at 1 kHz and 1 V.

Tests for the high temperature lifespan characteristics (high temperature IR boosting tests) were performed by maintaining conditions including 150° C. and 1 Vr=10 V/μm for 40 samples for each test number for 30 minutes, increasing the voltages in times, and calculating an averaged value of the voltage value. In this case, "1 Vr" refers to 1 reference voltage, and "10 V/μm" refers to a voltage of 10 V per 1 μm of thickness of a dielectric.

In addition, cross-sections of the sample chips in longitudinal and thickness directions (L-T cross-sections), cut in a central portion of each of the sample chips in the width direction, were analyzed by a transmission electron microscope (TEM) and an energy dispersive X-ray spectroscopy (EDS) apparatus to illustrate concentrations*, lengths*, and fractions* in Table 2 below. 200 kV ARM was used as the TEM, and was measured with spot 4, 100,000 times. STEM-EDS was measured with 100 points at 10 nm intervals.

The concentrations* were determined by performing an energy dispersive X-ray spectroscopy (EDS) line analysis installed on a transmission electron microscope (TEM) for grains having the core-dual shell structure, and dividing a value subtracted Dy intensity of a core from Dy intensity of a second shell, by a value subtracted Dy intensity of the core from Dy intensity of a first shell.

Figure 7:
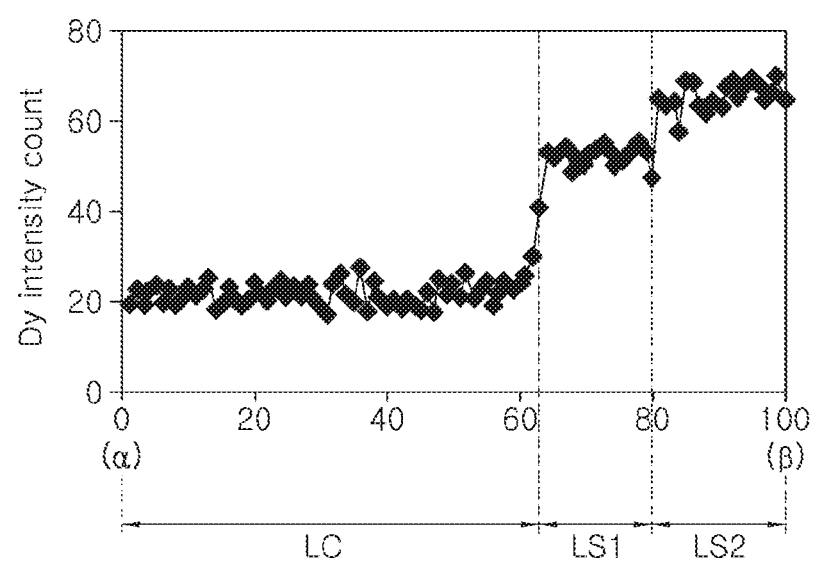
FIG. 7 illustrates intensities of Dy measured as results of XRF EDS line analysis for grains having a core-dual shell structure of the Inventive Example of Test No. 9.

The lengths* were determined by performing a TEM EDS line analysis for the grains having the core-dual shell structure as illustrated in FIG. 7, and illustrating results of [the number of points measured in the LS2]/[the total number of points measured from α to β].

The fractions* were determined by measuring ratios of the number of grains having a core-dual shell structure relative to the total number of dielectric grains in the 10 μm×10 μm regions, central portions of the cross-sections in the longitudinal and thickness directions (L-T cross-sections).

TABLE 1

| Test Nos. | Base Material Powders | Minor Components (Moles relative to 100 moles of Base Material Powders) | Firing Temp. (° C.) |
|---|---|---|---|
| 1* | 1.2Dy doped BT | Dy 1.3, Mn 0.05, Cr 0.2, Ba 2.4, Si 2.0, Al 1.0, Mg 0.4, Zr 0.4 | 1230 |
| 2 | | Dy 1.3, Mn 0.05, Cr 0.2, Ba 2.4, Si 2.0, Al 1.0, Mg 0.4, Zr 0.4 | 1250 |
| 3 | | Dy 1.3, Mn 0.05, Cr 0.2, Ba 2.4, Si 2.0, Al 1.0, Mg 0.4, Zr 0.4 | 1260 |
| 4* | | Dy 1.3, Mn 0.05, Cr 0.2, Ba 2.4, Si 2.0, Al 1.0, Mg 0.4, Zr 0.4 | 1280 |
| 5* | | Dy 0.5, Mn 0.05, Cr 0.2, Ba 2.4, Si 2.0, Al 1.0, Mg 0.4, Zr 0.4 | 1260 |
| 6* | | Dy 2.0, Mn 0.05, Cr 0.2, Ba 2.4, Si 2.0, Al 1.0, Mg 0.4, Zr 0.4 | 1260 |
| 7* | 0.5Dy doped BT | Dy 0.5, Mn 0.2, Ba 2.0, Si 2.0, Al 0.5 Mg 1.0, Zr 0.3 | 1210 |
| 8 | | Dy 0.5, Mn 0.2, Ba 2.0, Si 2.0, Al 0.5 Mg 1.0, Zr 0.3 | 1240 |
| 9 | | Dy 0.5, Mn 0.2, Ba 2.0, Si 2.0, Al 0.5 Mg 1.0, Zr 0.3 | 1250 |
| 10* | | Dy 0.5, Mn 0.2, Ba 2.0, Si 2.0, Al 0.5 Mg 1.0, Zr 0.3 | 1280 |
| 11* | Non doped BT | Dy 2.5, Mn 0.05, Cr 0.2, Ba 2.4, Si 2.0, Al 1.0, Mg 0.4, Zr 0.4 | 1250 |
| 12* | | Dy 1.0, Mn 0.2, Ba 2.0, Si 2.0, Al 0.5 Mg 1.0, Zr 0.3 | 1230 |

TABLE 2

| Test Nos. | Dielectric Constants | 125° C. TCC | High Temp. Lifespan Characteristics(V/μm) | Concentrations* | Lengths* | Fractions* | Examples |
|---|---|---|---|---|---|---|---|
| 1* | 2600 | −6% | 33 | 5.2 | 4/100 | 36% | Comparative |
| 2 | 2600 | −8% | 72 | 2.8 | 5/100 | 65% | Inventive |
| 3 | 2700 | −8% | 81 | 3.0 | 10/100 | 63% | Inventive |
| 4* | 3200 | −17% | 44 | 1.3 | 28/100 | 56% | Comparative |
| 5* | 3000 | −14% | 31 | 0.4 | 25/100 | 59% | Comparative |
| 6* | 2400 | −4% | 26 | 7.3 | 5/100 | 63% | Comparative |
| 7* | 2500 | −8% | 38 | 3.8 | 4/100 | 32% | Comparative |

TABLE 2-continued

| Test Nos. | Dielectric Constants | 125° C. TCC | High Temp. Lifespan Characteristics(V/μm) | Concentrations* | Lengths* | Fractions* | Examples |
|---|---|---|---|---|---|---|---|
| 8 | 2800 | −10% | 76 | 1.5 | 18/100 | 68% | Inventive |
| 9 | 3000 | −15% | 81 | 1.5 | 20/100 | 72% | Inventive |
| 10* | 2900 | −14% | 54 | 1.1 | 15/100 | 62% | Comparative |
| 11* | 2800 | −10% | 48 | — | — | — | Comparative |
| 12* | 2900 | −12% | 44 | — | — | — | Comparative |

Test Nos. 2, 3, 8, and 9 were confirmed that concentrations of the rare earth elements included in the second shells satisfy 1.3 times or more and less than 3.8 times concentrations of the rare earth elements included in the first shells, to provide excellent reliability for high temperature lifespan characteristics. In addition, Test Nos. 2, 3, 8, and 9 were confirmed that dielectric constants and 125° C. characteristics therefor are excellent.

Test Nos. 11 and 12, which do not include grains having a core-dual shell structure, were inferior in reliability for high temperature lifespan characteristics.

In addition, Test Nos. 1, 5 to 7, and 10, which include grains having a core-dual shell structure, but concentrations of the rare earth elements included in the second shell are 1.3 times or less or 2.8 times or more than concentrations of the rare earth elements included in the first shell, were inferior in reliability for high temperature lifespan characteristics.

In particular, Test Nos. 1 and 4 were confirmed to be inferior in reliability for high temperature lifespan characteristics, relative to Test No. 11 having the same composition and no core-dual shell structure, and Test No. 7 was confirmed to be inferior in reliability for high temperature lifespan characteristics, relative to Test No. 12 having the same composition and no core-dual shell structure. Therefore, it may be seen that the reliability for high temperature lifespan characteristics may be remarkably improved by controlling a concentration of a rare earth element included in the second shell to satisfy more than 1.3 times and less than 3.8 times a concentration of a rare earth element included in the first shell.

FIG. 7 illustrates intensities of Dy measured as results of XRF EDS line analysis for grains having a core-dual shell structure of Test No. 9, an Inventive Example.

In FIG. 7, intensity of Dy in a distance (LC) corresponding to a core is about 25 on average, which indicates that Dy is not present therein. The intensity of Dy in the distance (LC) corresponding to the core may vary, depending on TEM facility and measurement condition environments, but a portion having the lowest value of measured intensity may be regarded as the core, and there may be no Dy in the core.

Intensity of Dy in a distance (LS1) corresponding to a first shell is about 51 on average, and intensity of Dy in a distance (LS2) corresponding to a second shell is about 64 on average. Therefore, since a value subtracted Dy intensity of the core from Dy intensity of the second shell is 1.5 times a value subtracted Dy intensity of the core from Dy intensity of the first shell, a concentration of the rare earth element included in the second shell is 1.5 times a concentration of the rare earth element included in the first shell. Intensity of Dy in a distance (LS1) corresponding to the first shell and intensity of Dy in a distance (LS2) corresponding to the second shell may also vary, depending on TEM facility and measurement condition environments, but a ratio of concentrations of the rare earth elements between the first shell and the second shell may be maintained.

According to an aspect of the present disclosure, a ceramic electronic component includes a body including a dielectric layer and an internal electrode; and an external electrode disposed on the body and connected to the internal electrode, wherein the dielectric layer includes a plurality of dielectric grains, wherein at least one of the plurality of dielectric grains has a core-dual shell structure having a core and a dual shell, wherein the dual shell has a first shell surrounding at least a portion of the core, and a second shell surrounding at least a portion of the first shell, wherein a concentration of a rare earth element included in the second shell is more than 1.3 times to less than 3.8 times a concentration of a rare earth element included in the first shell.

According to another aspect of the present disclosure, a method of manufacturing a ceramic electronic component includes preparing a base material powder having a core-shell structure having a core and a shell, the shell including a rare earth element; adding a minor component to the base material powder to prepare a ceramic green sheet; printing a conductive paste for an internal electrode on the ceramic green sheet, and then stacking the printed ceramic green sheet to prepare a stacked body; firing the stacked body to prepare a body including a dielectric layer and an internal electrode; and forming an external electrode on the body, wherein an amount of the rare earth element included in the base material powder is more than 0.6 times to less than 2.4 times an amount of a rare earth element included in the minor component.

While embodiments have been illustrated and described above, it will be apparent to those skilled in the art that modifications and variations could be made without departing from the scope of the present disclosure as defined by the appended claims.

What is claimed is:

1. A ceramic electronic component comprising:
a body including a dielectric layer and an internal electrode; and
an external electrode disposed on the body and connected to the internal electrode,
wherein the dielectric layer comprises a plurality of dielectric grains,
wherein at least one of the plurality of dielectric grains has a core-dual shell structure having a core and a dual shell,
wherein the dual shell comprises a first shell surrounding at least a portion of the core, and a second shell surrounding at least a portion of the first shell, and
wherein a concentration of a rare earth element included in the second shell is more than 1.3 times to less than 3.8 times a concentration of a rare earth element included in the first shell.

2. The ceramic electronic component according to claim 1, wherein a thickness of the second shell along a straight line connecting α and β is greater than 4% and less than 25% of a distance between α and β, where α denotes a center of the core-dual shell structure in a cross-section of the core-dual shell structure, and β denotes a point farthest from α on a surface of the second shell.

3. The ceramic electronic component according to claim 2, wherein a thickness of the first shell along the straight line connecting α and β is 5 to 30% of the distance between α and β.

4. The ceramic electronic component according to claim 2, wherein a thickness of the first shell along the straight line connecting α and β is 0.5 to 1.5 times the thickness of the second shell along the straight line connecting α and β.

5. The ceramic electronic component according to claim 1, wherein a concentration of any rare earth element included in the core of the core-dual shell structure is 0.1 times or less than the concentration of the any rare earth element included in the first shell.

6. The ceramic electronic component according to claim 1, wherein the first shell in the core-dual shell structure is disposed to cover at least 90 area % of a surface of the core, and
the second shell in the core-dual shell structure is disposed to cover at least 90 area % of a surface of the first shell.

7. The ceramic electronic component according to claim 1, wherein at least one of the plurality of dielectric grains has a core-shell structure.

8. The ceramic electronic component according to claim 1, wherein a total number of dielectric grains having the core-dual shell structure in the dielectric layer is 50% or more of a total number of the plurality of dielectric grains in the dielectric layer.

9. The ceramic electronic component according to claim 1, wherein the dielectric layer comprises one or more of $BaTiO_3$, $(Ba,Ca)(Ti,Ca)O_3$, $(Ba,Ca)(Ti,Zr)O_3$, $Ba(Ti,Zr)O_3$, and $(Ba,Ca)(Ti,Sn)O_3$ as a main component.

10. The ceramic electronic component according to claim 9, wherein the dielectric layer has an amount of the rare earth element in a range of 0.1 to 15 moles, relative to 100 moles of the main component.

11. The ceramic electronic component according to claim 1, wherein the rare earth element is one or more of lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Ru).

12. The ceramic electronic component according to claim 9, wherein the dielectric layer further comprises one or more of Mn, Cr, Ba, Si, Al, Mg, and Zr as a minor component.

13. A method of manufacturing the ceramic electronic component of claim 1, comprising:
preparing ceramic green sheets each including a base material powder and a minor component added to the base material powder, the base material powder having a core-shell structure having a core and a shell, and the shell including a rare earth element;
printing a conductive paste for an internal electrode on the ceramic green sheets, and stacking the printed ceramic green sheets to prepare a stacked body;
firing the stacked body to prepare a body including a dielectric layer and an internal electrode; and
forming an external electrode on the body,
wherein an amount of the rare earth element included in the base material powder is more than 0.6 times to less than 2.4 times an amount of a rare earth element included in the minor component.

14. The method according to claim 13, wherein the dielectric layer comprises a plurality of dielectric grains,
wherein at least one or more of the plurality of dielectric grains has a core-dual shell structure having a core and a dual shell,
wherein the dual shell comprises a first shell surrounding at least a portion of the core of the core-dual shell structure, and a second shell surrounding at least a portion of the first shell,
wherein a concentration of a rare earth element included in the second shell is more than 1.3 times to less than 3.8 times the concentration of a rare earth element included in the first shell.

15. The method according to claim 14, wherein a thickness of the second shell along a straight line connecting α and β is greater than 4% and less than 25% of a distance between α and β, where α denotes a center of the core-dual shell structure in a cross-section of the core-dual shell structure, and β denotes a point farthest from α on a surface of the second shell.

16. The method according to claim 14, wherein a total number of dielectric grains having the core-dual shell structure in the dielectric layer is 50% or more of a total number of the plurality of dielectric grains in the dielectric layer.

17. The method according to claim 14, wherein the firing is performed at a firing temperature such that the concentration of the rare earth element included in the second shell is more than 1.3 times to less than 3.8 times of the concentration of the rare earth element included in the first shell.

18. The method according to claim 13, wherein the firing operation is carried out in a firing temperature range of more than 1230° C. to less than 1280° C.

19. A ceramic electronic component comprising:
a body including first and second internal electrodes overlapping each other with a dielectric layer disposed therebetween,
wherein, in a region of the dielectric layer disposed 0.41 μm or less from both the first and second internal electrodes, 50% or more of a total number of dielectric grains in the dielectric layer have a core-dual shell structure having a core, a first shell having a composition different from the core and surrounding at least a portion of the core, and a second shell having a composition different from the first shell and surrounding at least a portion of the first shell.

20. The ceramic electronic component of claim 19, wherein each of the first and second shells include a rare earth element in a concentration higher than the core.

21. The ceramic electronic component of claim 19, wherein a concentration of a rare earth element included in the second shell is more than 1.3 times to less than 3.8 times a concentration of a rare earth element included in the first shell.

22. The ceramic electronic component of claim 19, wherein a thickness of the second shell along a straight line connecting α and β is greater than 4% and less than 25% of a distance between α and β, where α denotes a center of the core-dual shell structure in a cross-section of the core-dual shell structure, and β denotes a point farthest from α on a surface of the second shell.

23. The ceramic electronic component of claim 19, wherein the dielectric layer has an amount of the rare earth element in a range of 0.1 to 15 moles, relative to 100 moles of a main component including one or more of $BaTiO_3$, $(Ba,Ca)(Ti,Ca)O_3$, $(Ba,Ca)(Ti,Zr)O_3$, $Ba(Ti,Zr)O_3$, and $(Ba,Ca)(Ti,Sn)O_3$.

24. A ceramic electronic component comprising:
a body including first and second internal electrodes overlapping each other with a dielectric layer disposed therebetween,
wherein, in a region of the dielectric layer disposed 0.41 μm or less from both the first and second internal electrodes, dielectric grains of the dielectric layer have core-shell structures having a core and a first shell surrounding at least a portion of the core and including a rare earth element in a concentration higher than the core,
the dielectric grains of the dielectric layer have core-dual shell structures further including a second shell having a composition different from the first shell, and
the second shell includes a rare earth element in a concentration higher than the first shell.

25. The ceramic electronic component of claim 24, wherein the concentration of the rare earth element included in the second shell is more than 1.3 times to less than 3.8 times the concentration of the rare earth element included in the first shell.

26. The ceramic electronic component of claim 24, wherein a thickness of the second shell along a straight line connecting $\alpha$ and $\beta$ is greater than 4% and less than 25% of a distance between $\alpha$ and $\beta$, where $\alpha$ denotes a center of the core-dual shell structure in a cross-section of the core-dual shell structure, and $\beta$ denotes a point farthest from $\alpha$ on a surface of the second shell.

* * * * *